United States Patent
Matthias et al.

(10) Patent No.: US 11,850,655 B2
(45) Date of Patent: Dec. 26, 2023

(54) PROCESS AND DEVICE FOR MANUFACTURING HOLLOW, INTERNALLY COOLED VALVES

(71) Applicant: FEDERAL-MOGUL VALVETRAIN GMBH, Barsinghausen (DE)

(72) Inventors: Thorsten Matthias, Garbsen (DE); Antonius Wolking, Barsinghausen (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 339 days.

(21) Appl. No.: 16/957,519

(22) PCT Filed: Dec. 6, 2018

(86) PCT No.: PCT/EP2018/083759
§ 371 (c)(1),
(2) Date: Jun. 24, 2020

(87) PCT Pub. No.: WO2019/137702
PCT Pub. Date: Jul. 18, 2019

(65) Prior Publication Data
US 2021/0053105 A1    Feb. 25, 2021

(30) Foreign Application Priority Data

Jan. 10, 2018  (DE) .................. 10 2018 100 413.3

(51) Int. Cl.
*B21K 1/24*    (2006.01)
(52) U.S. Cl.
CPC .................... *B21K 1/24* (2013.01)

(58) Field of Classification Search
CPC .......... B21K 1/24; B21K 21/16; B21K 21/08; B21D 41/04; B21C 3/02; B21C 3/04; B21C 3/16; B21C 1/22; B21C 1/24
See application file for complete search history.

(56) References Cited

U.S. PATENT DOCUMENTS

| 1,928,227 A * | 9/1933 | McCulloch ............... B21C 3/04 72/286 |
| 2012/0304464 A1 | 12/2012 | Morii et al. |
| 2014/0033533 A1 | 2/2014 | Morii et al. |

(Continued)

FOREIGN PATENT DOCUMENTS

| CN | 202053075 U | 11/2011 |
| DE | 102015220891 A1 | 4/2017 |
| EP | 2540414 A1 | 1/2013 |

(Continued)

OTHER PUBLICATIONS

International Search Report, dated Apr. 4, 2019 (PCT/EP2018/083759).

*Primary Examiner* — Debra M Sullivan
(74) *Attorney, Agent, or Firm* — Robert L. Stearns; Dickinson Wright PLLC

(57) ABSTRACT

A matrix for shaping a valve preform has a circular through opening and a reduced conical section. The reduced conical section tapers from an outer diameter to a reduced cone inner diameter, the outer diameter being greater than or equal to the initial outer diameter of the valve preform, and the matrix inner diameter being smaller than the initial outer diameter.

2 Claims, 6 Drawing Sheets

(56) References Cited

U.S. PATENT DOCUMENTS

2018/0304344 A1   10/2018   Kellermann

FOREIGN PATENT DOCUMENTS

| EP | 2690262 A1 | | 1/2014 | |
|---|---|---|---|---|
| GB | 777928 A | * | 3/1957 | ............. B21K 21/16 |
| JP | 2005118799 A | | 5/2005 | |
| JP | 2011167707 A | | 9/2011 | |
| WO | WO-0121338 A1 | * | 3/2001 | ....... A61B 17/32002 |

* cited by examiner

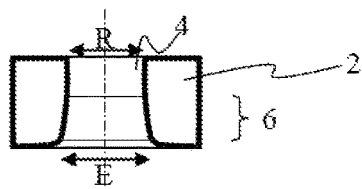
Fig. 1
State of
the Art
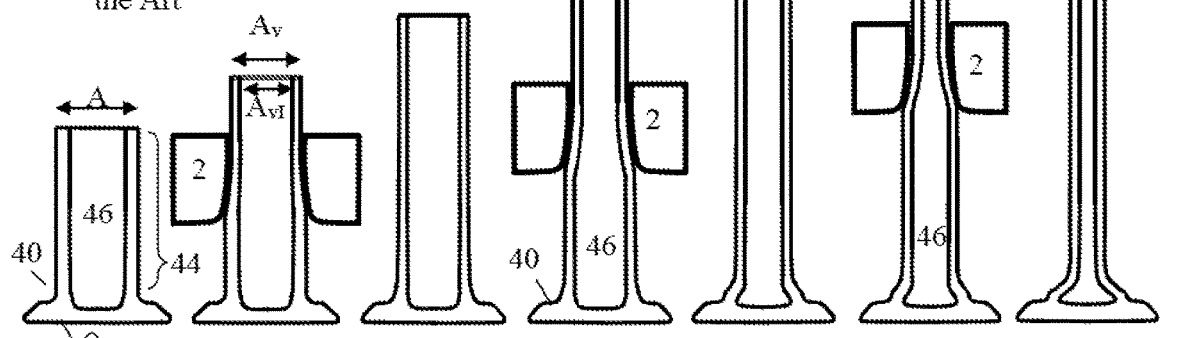
Fig. 2A  Fig. 2C  Fig. 2E  Fig. 2G
Fig. 2B  Fig. 2D  Fig. 2F
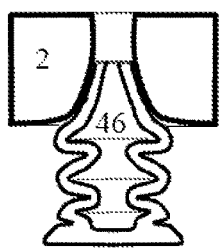
Fig. 2H

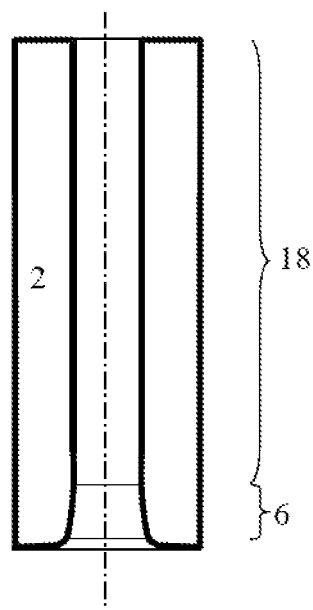
Fig. 4
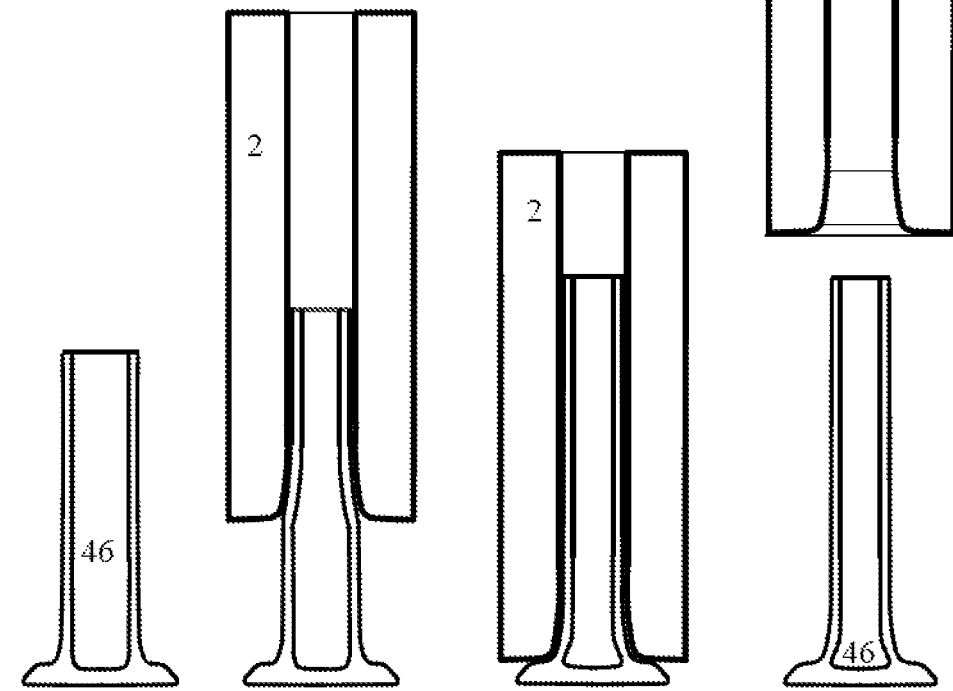
Fig. 5A
Fig. 5B
Fig. 5C
Fig. 5D

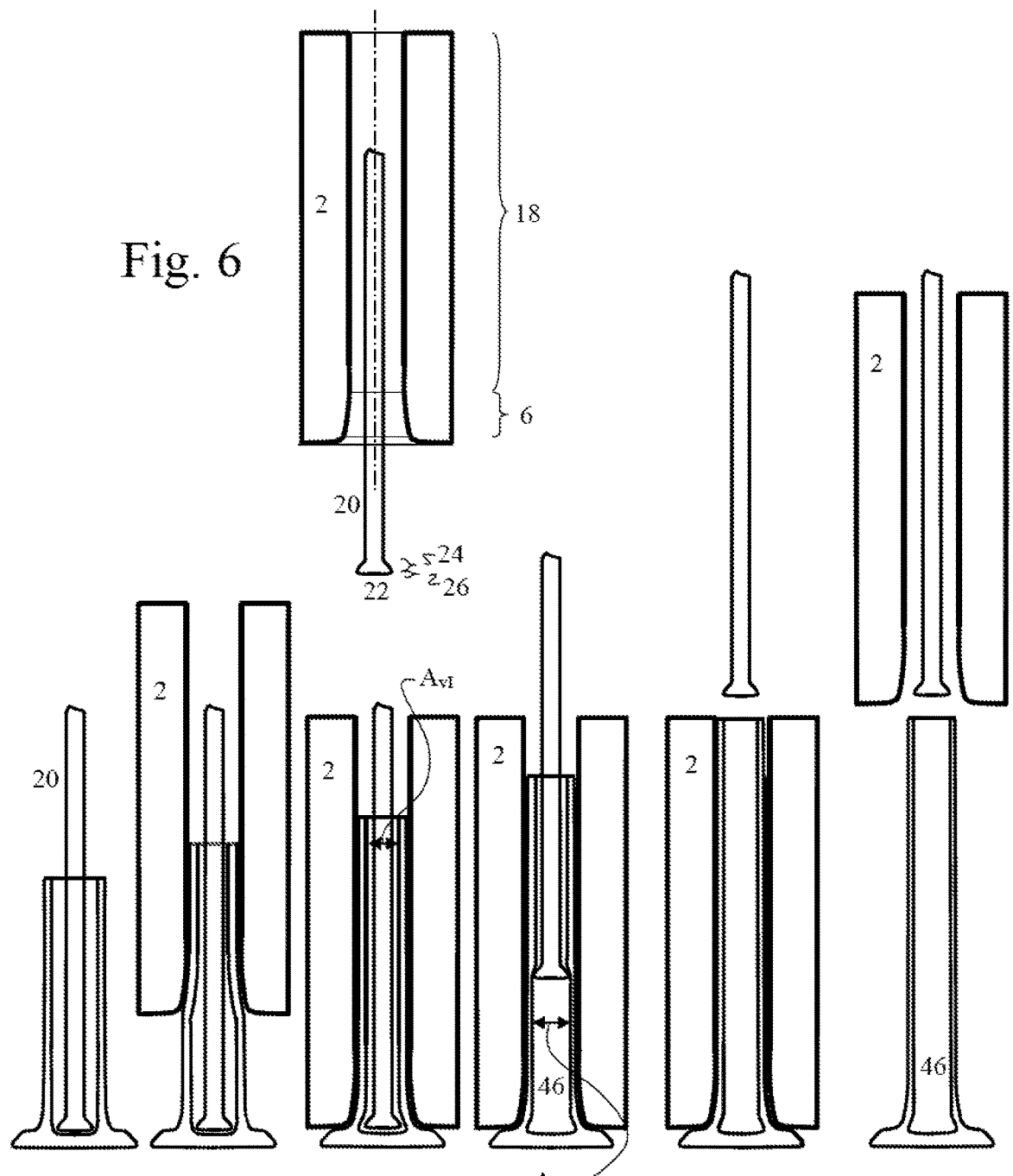

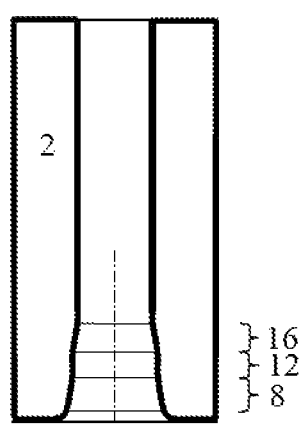
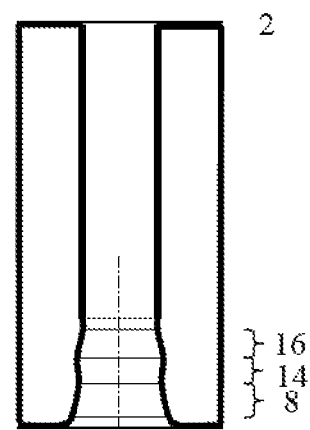
Fig. 10A    Fig. 10B
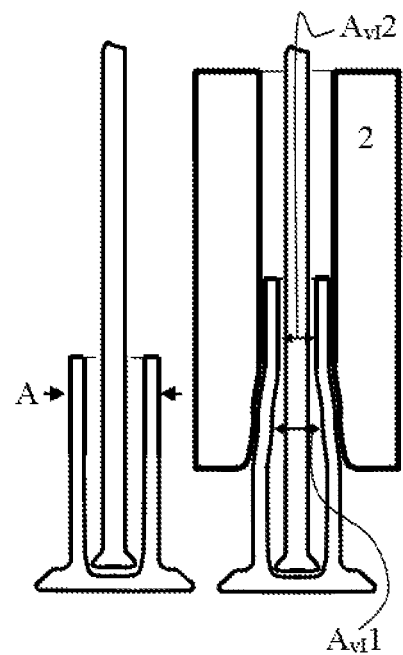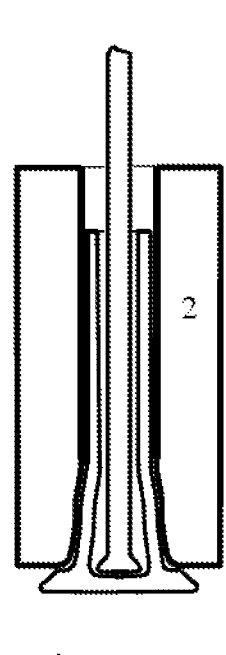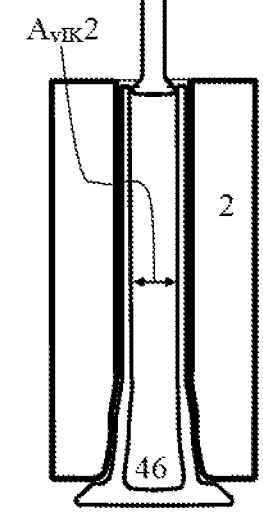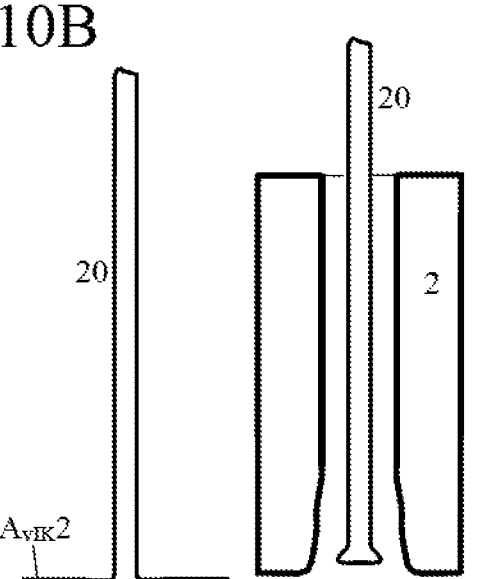
Fig. 11A   Fig. 11C   Fig. 11E
   Fig. 11B   Fig. 11D

PROCESS AND DEVICE FOR MANUFACTURING HOLLOW, INTERNALLY COOLED VALVES

BACKGROUND

1. Technical Field

The present invention relates to a method and a device for manufacturing hollow internally cooled valves. The invention relates in particular to the manufacture of valve blanks from valve preforms.

2. Related Art

Previously known methods for shaping valve preforms are known from the patent documents EP 2690262 A1, EP 2540414 A1, CN 202053075 U, JP2005 118799 A, JP 2011 167707 A, and DE 102015220891 A1.

EP 2690262 A1 relates to the manufacture of a valve having a hollow stem via rotary swaging and tapering by pressing into a matrix. The document EP 2540414 A1 likewise relates to tapering of a valve stem by pressing into a matrix. The document CN 202053075 U discloses a two-step method for cold drawing metal tubes. The document CN 202053075 U discloses a two-step method for cold drawing metal tubes. Japanese Patent application JP2005 118799 A discloses the manner in which a diameter of a tube may be reduced by pulling or pressing it through two matrices. Japanese Patent application JP 2001 167707 A describes a tensioning device for a tubular workpiece, wherein the draw plate is likewise provided with a type of core in order to shape the tubular workpiece, not only from the outside but also from the inside. The document DE 102015220891 describes a method for circular cross rolling of a valve stem.

The present method utilizes tapering of the cross section. The tapering is a production process for reducing cross sections of solid or hollow workpieces. In this process, only a portion of a valve preform is tapered. Tapering has relatively little importance, and is considered as a press-through operation, which in turn is part of pressure forming. Thus far, tapering has been used for manufacturing piece goods, in particular transmission shafts or wheel fastening bolts. For tapering, tubes or rods are used as a blank, and, the same as in all press-through methods, are pressed through a hollow tool (matrix), which in the case of tapering and extruding has the cross-sectional shape to be produced. During tapering, the blanks are not supported in front of the opening of the matrix, which may result in buckling or bulging when the free length is too great, or the wall thickness is too small or the tapering step is too large. However, due to the lack of support, the tapering may be satisfactorily combined with other methods.

SUMMARY

According to a first aspect of the present invention, a matrix for shaping a valve preform is provided. The matrix has a circular opening and a reduced conical section, the reduced conical section tapering from an outer diameter to a reduced cone inner diameter. The outer diameter is greater than or equal to an initial outer diameter of a valve preform to be shaped. The reduced cone inner diameter, in the present case also the matrix inner diameter, is smaller than the initial outer diameter of a valve preform to be shaped. The aim here is to shape only a stem section of a hollow valve, but not a disk section or a valve head section of a valve preform. An essentially rod- or tube-shaped valve stem section is pressed into an undersized conical hole, as the result of which a diameter of the valve stem section is reduced and a length of the valve stem section simultaneously increases due to conservation of mass. The method essentially corresponds to pulling wire through a draw plate, but is based on pushing or pressing, not on pulling. The stem area in front of the opening or the reduced conical section is subjected to compression load during the tapering. The compression load may result in buckling or compression of the valve stem. The compression load likewise represents a limit for a possible degree of tapering, since a rod subjected to stress can bear only a limited load, and since the degree of tapering is correlated with the pressure, the pressure is necessary to taper a stem section. It is therefore desirable to achieve a maximum degree of tapering to allow a valve preform to be shaped into a valve blank in preferably few tapering sections.

The matrix also provides an essential step for shaping valve preforms, wherein a stem of a valve preform with its hollow stem section is pressed into the matrix, and an initial outer diameter of the valve preform is reduced or tapered to the reduced cone inner diameter or matrix inner diameter. The matrix may also have a run-in area in order to guide a stem section to the reduced cone. In addition, the matrix may have an only approximately cone-shaped reduced conical section that deviates slightly from a purely conical shape. The reduced cone and the matrix may have a graduated reduced cone. The matrix may also be provided with features that are known from wire draw plates.

In another embodiment of the matrix, the reduced conical section is a first reduced conical section, and the matrix also includes a second reduced conical section, a transition section being situated between the first reduced conical section and the second reduced conical section. This design relates to a two-stage matrix in which a stem section is tapered in two successive stages. Situated between the tapering stages is a transition section that guides a tapered stem section from the entire outer side so that the tapered stem section cannot buckle. Since the stem section is already tapered, the second tapering stage requires less force, i.e., less pressure. This pressure may be better absorbed by the stem sections that are not yet tapered. The basic concept of this design lies not in improving an existing matrix by means of a second tapering stage, but rather, in using a completely redesigned matrix whose first tapering step is much smaller than for a one-stage matrix. The first tapering step is followed by a second tapering step, which likewise is smaller than for a one-stage matrix. However, a sum of the two tapering steps should be greater than what is possible with a one-stage matrix. This is due, among other things, to the fact that the force necessary for the second tapering does not increase until the stem end of the valve preform, which is tapered in the first tapering step, significantly increases or becomes greater when the valve stem end has already penetrated farther into the first reduced cone, and the shorter valve stem end buckles or fails only at a higher pressure force.

According to another exemplary embodiment of the matrix, the transition section between the first and the second reduced conical sections is cylindrical. This design generates a higher level of friction in the transition section, since the tapered material is not only plastically deformed but is also elastically deformed, and the elastic deformation cannot relax in the transition section. However, this type of transition section has the advantage that the second reduced section does not have to elastically deform the already tapered valve stem section again. At this point, the already tapered valve stem section is further plastically deformed upon entry into the second reduced section, which allows a shorter design of the matrix.

In an additional design of the matrix, the transition section expands between the first and the second reduced conical sections. In this design, the first reduced conical section tapers the pressed-in material more greatly than an inlet diameter of the second reduced conical section. The inner diameter of the first reduced conical section in this case is smaller than an inlet diameter of the second reduced conical section.

In another embodiment of the present invention, the matrix includes a cylindrical calibration section behind the reduced conical section and the second reduced conical section. The length of the calibration section is greater than a maximum length of the tapered or twice-tapered stem section. The calibration section is used here to place the stem section in straight alignment, and to keep an outer surface of the stem section circular and smooth after the tapering. A high level of friction in the calibration section may be reduced by means of a lubricant. The calibration section may have a diameter that is equal to the inner diameter of the matrix, which, however, creates relatively high friction. This component of the friction continuously increases with the pressing in. However, the increasing component of the friction does not have a particularly adverse effect during the tapering operation, since the length of the free, untapered stem section decreases during tapering and can thus absorb increasingly greater pressing or pressure forces. It is likewise possible for the diameter of the calibration section to be greater than the inner diameter of the matrix, wherein the stem can deform by the amount of the elastic component. This design has greatly reduced friction in the calibration section, so that the pressing forces for pushing in the stem section of the valve preform may be significantly lowered.

In a further design of the matrix, the matrix is provided with a calibration mandrel. In this design, the matrix includes a calibration mandrel that is movable with respect to the matrix. A calibration bulb is situated on a free end of the calibration mandrel. The calibration bulb may be designed in one piece with the calibration mandrel. The calibration bulb may also be designed as a ring that is placed around the calibration mandrel. The calibration mandrel and in particular the calibration bulb are situated in or in front of (in the taper direction) an area of the reduced conical section during the tapering. For a two-stage matrix, the calibration bulb is situated in or in front of (in the taper direction) an area of the second reduced conical section during the tapering.

It is emphasized that the calibration bulb is not used during the tapering itself, but instead is pulled from the head section through the stem to the stem end after the valve stem has already been completely pressed into the matrix/the calibration section. During the calibration the stem section elongates, since a portion of the material of the stem is displaced in the direction of the stem end during the calibration. By use of the method, the inner diameter of the already tapered stem section is increased and the wall thickness of the stem section is decreased and made uniform. In addition, the length of the stem section further increases due to the calibration.

In the case of a two-stage matrix or a matrix, only the portion of the stem that has passed the second tapering stage is calibrated. The calibration bulb is thus pulled through the matrix at least from the second reduced conical section to one end of a calibration section. The calibration bulb is pulled out from the stem end at the end. The radial profile of the calibration bulb may correspond to the draw plate or the matrix, with a calibration cone displacing the stem material outwardly. A mating cone that is required by an elastic component of the deformation may be situated behind the calibration cone. In addition, the mating cone may support the area of the calibration cone against the pulling direction of the calibration bulb. The mating cone also provides the advantage that the elastically deforming stem section is centered in the calibration section.

According to another embodiment of the present invention, a tapering machine for shaping a valve preform is provided which uses one of the matrices described above. The tapering machine includes a pressing device that can press a valve preform with a stem section into the matrix. In this design, the matrix is provided with an actuator, such as a hydraulic press, with which the matrix and the valve preform may be moved against one another in order to press a stem section of the valve preform into the matrix.

In another embodiment of the tapering machine, the tapering machine also includes a pressing device controller that is adapted to control the pressing device in such a way that the valve preform is pressed with the stem section into the matrix with an oscillating force. Reduced friction during the tapering may be achieved via an oscillating force. In addition, a lubricant may be better introduced between the valve preform and the matrix as the result of an oscillating force.

In another embodiment of the tapering machine, the tapering machine also includes a pressing device controller that is adapted to control the pressing device in such a way that the valve preform is pressed with the stem section into the matrix with an oscillating path. Reduced friction during the tapering may be achieved via the oscillating path. In addition, a lubricant may be better introduced between the valve preform and the matrix as the result of an oscillating force, since the portion of the preform or of the matrix that elastically deforms may facilitate transport of a lubricant into the gap between the preform and the matrix. Due to an oscillating motion, the valve preform is subjected to frequent elastic deformations, which also brings about a decrease in the stem diameter. After passing through the narrowest point of the matrix, the stem once again extends in a partially elastic manner, and is likewise elastically tapered once again during a reverse pass through the matrix. Due to the required tensile force, at least a portion of the stem section that is not yet tapered is lifted from the reduced cone and a lubricant can be introduced into the resulting gap, so that the overall friction may be reduced. This operating mode of the tapering machine may be referred to as a forward-and-counter-cycling movement; a forward movement is followed by a correspondingly smaller reverse movement, and these two steps are cyclically repeated. Due to the oscillating path, the maximum force necessary for pressing the stem section into the matrix may be reduced, since, for example, a pressure is used for pressing with the stem section into the matrix.

Furthermore, according to an additional embodiment, the tapering machine may also include a calibration mandrel tensioning device. The calibration mandrel tensioning device is configured, after a valve preform is pressed with a hollow stem into the matrix, to pull the calibration mandrel from a head section of the valve preform, through a stem section of the valve preform, and out of a stem end. The tapering machine with the calibration mandrel tensioning device, together with the matrix, is used with the calibration mandrel. It is likewise provided to use the above-described control for an oscillating force and/or path control, also for the calibration mandrel tensioning device, wherein the pressing device controller likewise takes over control of the tensioning device, or a separate tensioning device controls the calibration mandrel tensioning device so as to exert an oscillating path/oscillating force during pulling of the calibration mandrel.

According to another aspect of the present invention, a method for shaping a hollow valve preform is provided. The method includes providing a valve preform that includes a head section and a hollow stem section, and providing a matrix. The valve preform includes a stem section having an initial outer diameter. The type of matrix is as described above. As an alternative to the matrix, one of the above-described tapering machines in which a matrix is situated may likewise be used. The method also includes pressing the hollow stem section into the matrix, the initial outer diameter being tapered to the reduced cone inner diameter. The tapering may also be somewhat less, since a portion of the tapered valve stem section elastically springs back, and will thus have a slightly larger outer diameter than a clearance of the matrix. In addition, the fact that the inner diameter of the matrix is elastically increased during the tapering must be taken into account. These aspects are not considered here, since the particular dimensions are understood as those which provide the appropriate result, and not as the dimensions that are actually present in the components and elements not under load.

The valve preform is pressed with a stem section into a circular opening having a reduced conical section of the matrix, wherein the reduced conical section tapers the stem section from an initial outer diameter to a matrix inner diameter. An outer diameter of the opening of the matrix is greater than or equal to the initial outer diameter of the valve preform, and the matrix inner diameter is smaller than the initial outer diameter of the stem section.

According to another embodiment of the method, a two-stage matrix having two reduced cones is used. The reduced conical section forms a first reduced conical section that tapers a stem section of the valve preform to a first reduced conical section inner diameter. A further second reduced conical section is provided in the matrix in order to further taper the stem section of the valve preform, which is already tapered to the first reduced conical section inner diameter, to a (yet smaller) inner diameter of the second reduced conical section inner diameter. Situated between the first and the second reduced conical sections is a transition section in which the stem section, which is tapered to the first reduced conical section inner diameter, is not further machined. This method includes double or successive tapering during a single pass through the matrix. The individual stages are smaller than for a one-stage matrix, but the sum of the two stages is greater than that of a one-stage matrix. The method makes use of the structure and buckling tendency of the stem section; the force for buckling is a function of the length of a rod. Due to the tapering of the first stage, the stem section is shortened to the extent that it can be pressed with a greater force into the second reduced cone; in addition, less deformation takes place in the second reduced cone.

In another embodiment of the method, the transition section expands between the first and the second reduced conical sections; a diameter of the stem section that is tapered in the first stage or the first reduced cone likewise increases in the area. The stem section that is tapered to the first reduced conical section inner diameter once again increases in terms of a partial elastic deformation to a larger outer diameter than the first inner diameter of the first reduced cone. The stem section that is tapered in a first stage may slightly extend once again before it is tapered to its final diameter in the second reduced conical section. The first reduced conical section tapers the pressed-in material more intensely than on an inlet diameter of the second reduced conical section.

Another embodiment of the method for shaping a hollow valve preform uses a matrix that includes a cylindrical calibration section behind the reduced conical section or the second reduced conical section. An end outer diameter of the tapered or twice-tapered stem section is calibrated here by a cylindrical portion of the matrix. The calibration produces only a straight tapered stem section. The strictly external calibration may also result in a smooth, circular surface of the tapered or twice-tapered stem section. The calibration section is more effective the closer its inner diameter is to the inner diameter of the matrix. Increased friction may be reduced by additional lubrication directly behind the matrix and in front of the calibration section. The forming machine here may be provided with separate lubricant injection or a grease gun.

In a further embodiment, in a method for shaping a hollow valve preform in which the matrix additionally includes a calibration mandrel that is provided with a calibration bulb on a free end, the method further includes pulling the calibration bulb through the tapered stem. Before and during pressing in of the valve preform in the at least one tapering step, the calibration mandrel is inserted and held in front of or at an area of the reduced conical section or the second reduced conical section. After pressing in and tapering, the calibration mandrel with the calibration bulb is pulled through the reduced conical section or the second reduced conical section and through the calibration section, up to and out of the stem end. During the calibration with the calibration bulb, a wall thickness of the tapered or twice-tapered stem section of the valve preform is made uniform. The material of the stem section that is displaced during the calibration is moved in the direction of the stem end, and the stem section is additionally lengthened. The calibration bulb is pulled through the matrix to one end of a calibration section. The calibration bulb has a diameter that is greater than an inner diameter of the tapered or twice-tapered stem section. The greatest degree of deformation is achieved during the pass of the calibration bulb through the matrix. The stem section is further elongated and straightened via the pass of the calibration bulb through the calibration section.

In an additional embodiment of the tapering method, the tapering method also includes use of a pressing device controller, wherein the pressing device controller controls a pressing device in such a way that the valve preform with the stem section is pressed into the matrix with an oscillating force and/or an oscillating path. Use is made of the fact that the force/path curve favors pressing in versus buckling of the untapered stem section. It is likewise provided that the valve preform is pressed or rammed into the matrix in multiple steps. The method prevents a stick-slip effect in which the valve preform is pulled back out of the matrix before increased static friction between portions of the preform and of the matrix can occur.

The following procedure is carried out for vibration superimposition in the main shaping direction. The vibration superimposition in the main power flow during the shaping may take place by mechanical vibration excitation (such as pneumatic vibrators or beaters, for example hydraulic systems) or electromagnetic systems (piezoactuators, magnetostrictive exciters, for example). Vibration superimposition may also be achieved via ultrasonic vibration. The frequencies and amplitudes are greatly dependent on the drive that is selected. The frequency may thus be 2 Hz to 50 kHz, and the amplitude may be 1 µm to 2 mm.

The present invention is explained below with reference to schematic illustrations of exemplary embodiments.

THE DRAWINGS

FIG. 1 shows a prior art one-stage matrix for tapering a stem section of a valve preform.

FIGS. 2A through 2G illustrate individual steps of a method for shaping a valve preform to form a valve blank.

FIG. 2H illustrates an unsuccessful tapering attempt according to.

FIG. 4 shows a one-stage matrix having an additional calibration section.

FIGS. 5A through 5D illustrate a shaping operation using the matrix in FIG. 4.

FIG. 6 shows a special form of the one-stage matrix from FIG. 4, which is also provided with a calibration mandrel.

FIGS. 7A through 7F illustrate a shaping operation according to an embodiment using the matrix in FIG. 4, in which the cavity is calibrated in a separate step.

FIGS. 10A and 10B show two two-stage matrices that are additionally provided with a calibration section.

FIGS. 11A through 11E illustrate a shaping operation according to an embodiment using the matrix in FIG. 10A, in which the cavity is calibrated in a separate step.

DETAILED DESCRIPTION

Figures 3A, 3B, 3C, 3D, 3E, 3F, 3G:
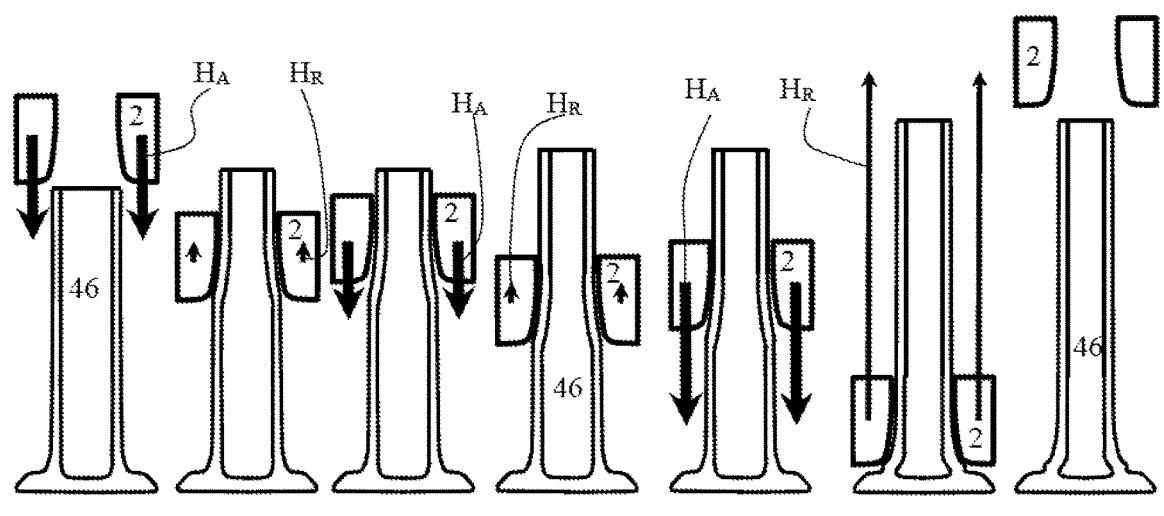
FIGS. 3A through 3G illustrate possible substeps of the method in FIGS. 2C through 2E.

In the following discussion, identical or similar reference symbols are used for identical or similar elements and components in the description and in the figures.

FIG. 1 shows a prior art one-stage matrix 2 for tapering a stem section of a valve preform. The matrix 2 includes a through opening 4 having a circular cross section. The through opening 4 includes a reduced conical section 6 in which the through opening 4 tapers from an inlet diameter E of the matrix 2 to a reduced cone inner diameter R of the matrix 2. The reduced cone inner diameter R here also determines the matrix inner diameter.

A mating cone or a straight section may be situated behind the reduced cone inner diameter. An insertion structure such as a run-in cone or a rounded section may be present in front of the reduced cone to facilitate entry of a stem section of a valve preform into the matrix.

In the present design, the matrix essentially forms a draw plate as known from the shaping process of wire drawing. In contrast to wire drawing, however, the matrix is intended for a stem section of a valve preform to be pressed into the matrix from the outside or from below. Thus, a completely different load situation is present. In addition, a mating cone, which is mandatory in a draw plate, may be dispensed with in the matrix. Therefore, in one design the matrix also has no mating cone, and instead, the tapered or reduced cone merges directly into a cylindrical section as illustrated.

FIGS. 2A through 2G illustrate individual steps of a method for shaping a valve preform 40 to form a valve blank. The valve preform 40 includes a disk section 42, also referred to as a head section, and a stem section 44, the material of which subsequently forms a valve stem. A cavity 46 that extends from one end of the stem section 44 in the direction of the disk section 42 is situated in the stem section. In one aspect of the invention, the cavity in the area of the disk section 42 has a radius that is larger than that of a stem of the subsequent valve. In this way a cavity may be produced in a valve relatively easily, the cavity having a larger diameter in the head of the valve than could be achieved by machining. The stem section 44 of the valve preform 40 has an initial outer diameter A that is smaller than an inlet diameter E of the matrix 2.

In FIG. 2B, the stem section 44 of the valve preform 40 has been pressed approximately halfway into the matrix 2 in FIG. 1. In the process, the initial outer diameter A has been reduced to a tapered outer diameter $A_v$. The tapering has reduced both the outer diameter and the inner diameter of the stem section, whereas the length of the stem section has been increased by the shaping.

In FIG. 2C, the matrix 2 has been removed after being moved toward the disk section 42 (i.e., the valve preform 40 has been pressed into the matrix 2 up to the disk section 42). The once-tapered stem section 44 of the valve preform 40 may now be further tapered with an additional matrix having a smaller inner diameter. It is possible to subject the valve preform 40 to stress relief annealing to facilitate a subsequent tapering step.

FIG. 2D corresponds to FIG. 2B, only using a smaller matrix and the valve preform in FIG. 2C, which has already been deformed once.

FIG. 2E corresponds to FIG. 2C; however, the valve preform has been shaped in two steps.

FIG. 2F corresponds to FIGS. 2B and 2D, only using an even smaller matrix, and the valve preform in FIG. 2E, which has already been deformed twice, is further tapered.

FIG. 2G shows a valve preform that has been shaped a sufficient number of times that it may be regarded as a valve blank. FIG. 2E corresponds to FIG. 2D; however, the valve preform has been shaped in two steps. The cavity of the valve blank may now be partially filled with a coolant such as sodium and closed. It is likewise possible to machine an outer surface of the valve blank to achieve desired surface qualities and tolerances.

FIG. 2H schematically shows the main problem during a tapering step, namely, the risk of the stem section buckling or bulging in or out during tapering. Since the tapering subjects the material to pressure, the pressure force at which failure of the stem section occurs is limited. For this reason, the stem section of the valve preform must also be tapered in multiple steps. Depending on the selected material, significantly more than three passes may be necessary to shape a valve preform into a valve blank.

FIGS. 3A through 3G illustrate possible substeps of the method in FIGS. 2C through 2E. Instead of a single shaping operation, in the present case shaping is carried out intermittently or in sections. In FIG. 3A, the stem section with approximately one-fourth of its length is pressed into the matrix with great force in a working stroke $H_A$, as indicated by the long, thick arrows. The small path prevents the stem section from buckling.

In FIG. 3B, the stem section has been pulled slightly out of the matrix in a reverse stroke $H_R$. At this point a lubricant may be introduced between the matrix or the reduced cone and the stem section, thus allowing a further reduction in the force required for the tapering.

In FIG. 3C, the stem section with approximately an additional one-fourth of its length is pressed further into the matrix with great force as in FIG. 3A, as indicated by the long, thick arrows. The small path prevents the stem section from buckling.

In FIG. 3D, the stem section has been pulled slightly out of the matrix. At this point a lubricant may once again be introduced between the matrix or the reduced cone and the stem section.

In FIG. 3E the stem section is now pressed with great force into the matrix until reaching the disk section. Since the untapered tapered stem section is shorter and has a more favorable position [sic; length] to diameter ratio, the last portion may be shaped with a working stroke $H_A$ without the risk of the undeformed stem section buckling. It is thus possible to carry out working strokes $H_A$ and reverse strokes $H_R$ here in alternation. It is likewise provided to increase the larger [sic; magnitude] or the length of the working strokes $H_A$ in each case. It is preferred to start with small working strokes $H_A$ and increase their length linearly. It is further preferred to start with small working strokes $H_A$ and progressively increase their length.

In FIG. 3G, the stem section has been pulled completely out of the matrix in a long reverse stroke $H_R$. The other shaping steps as explained for FIGS. 2A through 2G may likewise be carried out with an oscillating path or alternating working strokes and reverse strokes. The pressing in with an oscillating path may also be used as explained below.

FIG. 4 represents a matrix that essentially corresponds to the one illustrated in FIG. 1. In addition, the matrix is provided with a calibration section 18 in which the tapered stem section is guided and directed. The tapered stem section cannot yield laterally in the matrix, as the result of which a straight stem may be achieved. A straight stem may be more easily shaped in a subsequent matrix, since it has a lesser tendency to break out to the side. The greater precision is attained here by a greater pressing-in force, which corresponds to a lower degree of tapering. However, in the method in FIGS. 3A through 3G, the friction component in the calibration section 18 may be kept low by use of lubricant.

FIGS. 5A through 5D correspond to FIGS. 2C through 2E. Here as well, the oscillating pressing-in method from FIGS. 3A through 3G may be utilized to achieve a higher degree of tapering.

FIG. 6 shows a special form of the one-stage matrix from on FIG. 4, which is additionally provided with a calibration mandrel 20. The calibration mandrel at a free end includes a calibration bulb 22 that includes a calibration cone 24 and a mating cone 26 on one side.

The calibration mandrel is moved essentially independently of the matrix itself. During pressing in, the calibration mandrel 20 is not moved with respect to a disk section 42 of the valve preform 40, and is not used to maintain a defined gap between the calibration bulb 22 and the reduced section during pressing in.

In FIG. 7A, according to an embodiment, the calibration mandrel 20 together with the calibration bulb 22 is lowered down to the bottom of the cavity of the valve preform 40. An outer diameter of the calibration bulb 22 is smaller than an inner diameter of the cavity 46. The calibration bulb corresponds to exactly one turned-up draw plate as known from wire drawing.

In FIGS. 7B and 7C, according to the embodiment, the stem section 44 of the valve preform 40 is pressed into the matrix 2 under the control of a pressing device and pressing device controller, schematically shown at PR, and the calibration mandrel 20 is moved together with the valve preform 40. The calibration bulb 22 remains at the base of the cavity 46 during the pressing in.

During the pressing into the matrix, the inner diameter of the stem section is reduced to the tapered inner diameter. The tapered inner diameter is smaller than an outer diameter of the calibration bulb 22.

In FIG. 7D, according to the embodiment, the calibration mandrel 20 is pulled through the stem section and out of the cavity 46 in the direction of arrow B under the control of a pulling device and pulling device controller, PL. The calibration bulb 22 pushes material of the stem section in front of it, thus further increasing the length of the stem section. At the same time, the outer diameter of the stem section and its wall thickness are made uniform.

Lastly, in FIG. 7E, according to the embodiment, the tapered, calibrated stem section of the valve preform is pulled out of the matrix 2. The tapered, calibrated stem section of the valve preform has the same outer diameter $A_v$ as an uncalibrated stem section. The tapered, calibrated stem section of the valve preform has a larger calibrated inner diameter $A_{vIK}$ than the uncalibrated stem section from FIG. 5D.

Figures 8A, 8B, 8C:
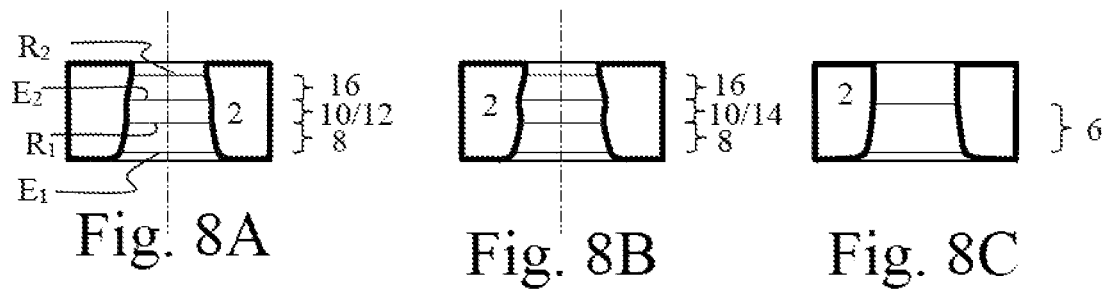
FIGS. 8A through 8C show two two-stage matrices and a one-stage matrix.
Figures 9A, 9B, 9C, 9D, 9E:
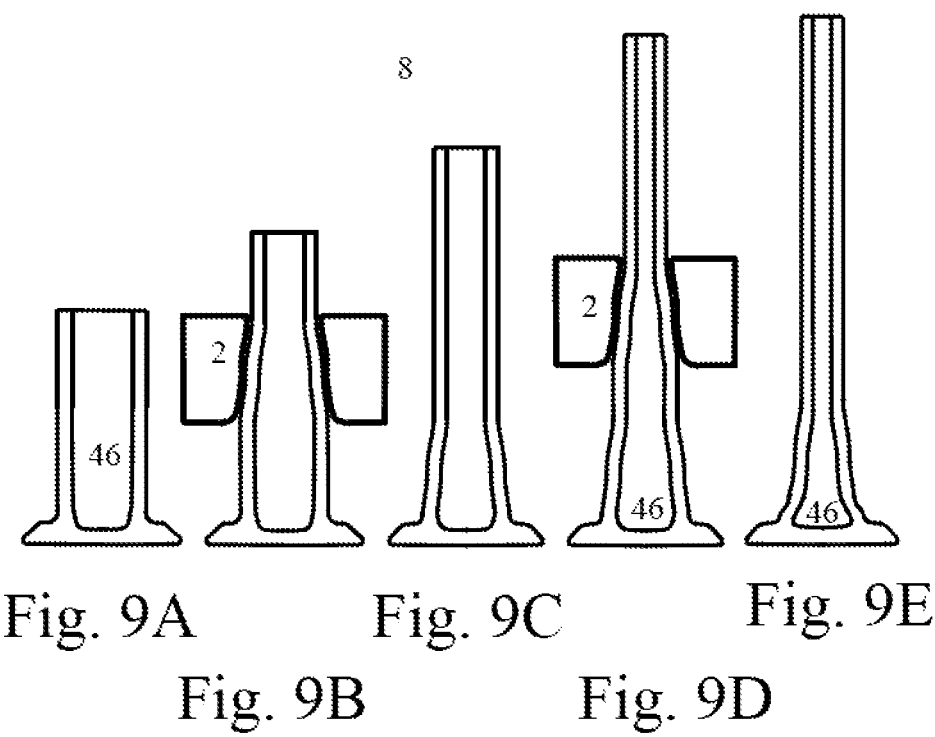
FIGS. 9A through 9E illustrate a shaping operation using the matrix in FIG. 8A, in which the cavity is calibrated in a separate step.

FIGS. 8A through 8C show two two-stage matrices and a one-stage matrix.

The matrix in FIG. 8C corresponds to the one-stage matrix shown in FIG. 1, with a single reduced cone, and is used here for illustration only. The matrix 2 includes a reduced conical section 6 that tapers from an inlet diameter E to a reduced cone inner diameter R. The reduced cone inner diameter R here also determines the matrix inner diameter. A simple mating cone is situated behind the reduced cone.

The matrix in FIG. 8A represents a two-stage matrix having a first reduced cone 8 and a second reduced cone 16. A cylindrical transition section 12 is situated between the first reduced cone 8 and the second reduced cone 16. The first reduced cone 8 has a first inlet diameter $E_1$. The first reduced cone 8 tapers to a first reduced cone inner diameter $R_1$. The second reduced cone 16 has a second inlet diameter $E_2$, which in this case is equal to the first reduced cone inner diameter $R_1$. The second reduced cone 16 tapers from the second inlet diameter $E_2$ to the second reduced cone inner diameter $R_2$.

The aim is for the difference between $E_1$ and $R_2$ to be greater than the difference between E and R of the matrix from FIG. 8C. This is possible due to the fact that a lower load on the material may be achieved when two tapering stages are carried out in succession.

The matrix in FIG. 8B represents a two-stage matrix having a first reduced cone 8 and a second reduced cone 16. A diverging transition section 14 is situated between the first reduced cone 8 and the second reduced cone 16. The first reduced cone 8 has a first inlet diameter $E_1$. The first reduced cone 8 tapers to a first reduced cone inner diameter $R_1$. The second reduced cone 16 has a second inlet diameter $E_2$ that is larger than the first reduced cone inner diameter $R_1$. The second reduced cone 16 tapers from the second inlet diameter $E_2$ to the second reduced cone inner diameter $R_2$. The matrix here has the shape of two draw plates situated in direct succession. This shape is not suitable for wire drawing, since the tensile load cannot be absorbed by a thinner wire.

FIGS. 9A through 9E illustrate a shaping operation using the matrix in FIG. 8A, in which the stem section is tapered in two stages with each pressing-in operation.

FIGS. 10A and 10B show the two-stage matrices in FIGS. 8A and 8B, which are additionally provided with a calibration section 18.

FIGS. 11A through 11E illustrate a shaping operation, according to an embodiment, using the matrix in FIG. 10A, in which the cavity is calibrated in a separate step. The method corresponds to the one illustrated in FIGS. 7A through 7G. However, the calibration concerns only the portion of the tapered stem section that has been tapered from the second reduced cone.

The invention claimed is:

1. A method for shaping a hollow valve preform a using a tapering machine having a matrix with a circular through opening that tapers from an outer diameter of the opening to a reduced cone inner diameter, and wherein the outer diameter is greater than or equal to an initial outer diameter of the valve preform, and the matrix reduced cone inner diameter is smaller than the initial outer diameter of the valve preform, and further including a pressing device and a pressing device controller that are configured for pressing the valve preform with a stem section thereof into the matrix with an oscillating motion, the method comprising the steps of:
   providing the valve preform with a head section and the hollow stem section having initial outer diameter,
   pressing the hollow stem section into the matrix with the initial outer diameter that is tapered to the reduced cone inner diameter as a result of pressing the initial outer diameter into the matrix,
   controlling the pressing device of the tapering machine with the pressing device controller in such a way that the valve preform with the stem section is pressed into the matrix with an oscillating force and/or an oscillating path; and
providing a calibration mandrel which on a free end includes a calibration bulb; inserting the calibration bulb into the valve preform before the pressing step, and wherein after the pressing step, pulling, the calibration mandrel and out of the stem end to further reduce a wall thickness of the hollow stem section and to increase a length of the hollow stem section.

2. The method of claim 1, wherein the oscillating path comprises a forward movement step followed by a correspondingly smaller reverse movement step.

* * * * *